(12) United States Patent
Okamoto et al.

(10) Patent No.: US 6,979,020 B2
(45) Date of Patent: Dec. 27, 2005

(54) AIR BAG SYSTEM

(75) Inventors: Mitsuyasu Okamoto, Himeji (JP); Shingo Oda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 99 days.

(21) Appl. No.: 10/350,000

(22) Filed: Jan. 24, 2003

(65) Prior Publication Data

US 2004/0104562 A1    Jun. 3, 2004

Related U.S. Application Data

(60) Provisional application No. 60/359,990, filed on Feb. 28, 2002.

(30) Foreign Application Priority Data

Jan. 25, 2002    (JP) ............................. 2002-016326

(51) Int. Cl.$^7$ ............................................ B60R 21/32
(52) U.S. Cl. ...................................... 280/735; 307/10.1
(58) Field of Search ........................... 280/735, 741; 307/10.1; 102/202.2, 202.5, 202.7, 202.9, 102/215, 218; 340/438, 436

(56) References Cited

U.S. PATENT DOCUMENTS

| | | | |
|---|---|---|---|
| 4,819,560 A | | 4/1989 | Patz et al. |
| 5,422,965 A | * | 6/1995 | Bekki et al. ................. 280/735 |
| 6,081,044 A | * | 6/2000 | Anthofer et al. ............. 280/735 |
| 6,166,452 A | * | 12/2000 | Adams et al. .............. 307/10.1 |

(Continued)

FOREIGN PATENT DOCUMENTS

JP    2707250 B2    10/1997

(Continued)

OTHER PUBLICATIONS

Munger, A.C., "Electrothermal Response Testing, A Component Development Tool," Seventh International Pyrotechnics Seminar, Jul. 1980, pp. 461-478, vol. 1, IIT Research Institute, Vail, Colorado.

*Primary Examiner*—David R. Dunn
*Assistant Examiner*—Joselynn Y. Sliteris
(74) *Attorney, Agent, or Firm*—Birch, Stewart, Kolasch & Birch, LLP

(57) ABSTRACT

An air bag system includes an ECU, a plurality of module cases accommodating a plurality of gas generators and a plurality of air bags, and a bus line having a plurality of loop wires passing through the ECU to supply and transmit currents. The gas generators are connected operationally by a plurality of conductors branched from the bus line. An igniter is connected to the bus line and a capacitor and an IC are provided for each igniter. A current for igniting a priming is supplied to the igniter through the capacitor in the igniter, and a time period for supplying the current is from the point where a current value reaches a value corresponding to 5% of the maximum current value to the point where it is reduced to a value corresponding to 5% of the maximum current value, which is within 500 μsec.

26 Claims, 14 Drawing Sheets

U.S. PATENT DOCUMENTS

| | | | |
|---|---|---|---|
| 6,208,924 B1 * | 3/2001 | Bauer ........................... | 701/45 |
| 6,286,862 B1 * | 9/2001 | Blank et al. ................. | 280/236 |
| 6,332,399 B1 * | 12/2001 | Laucht et al. ............... | 102/206 |
| 6,418,853 B1 | 7/2002 | Duguet et al. | |
| 6,477,457 B1 * | 11/2002 | Fendt et al. ................. | 280/735 |
| 6,512,308 B2 * | 1/2003 | Boezen et al. .............. | 280/735 |

FOREIGN PATENT DOCUMENTS

| | | |
|---|---|---|
| JP | 2000-241098 A | 9/2000 |
| JP | 2000-513799 A | 10/2000 |
| JP | 2001-171475 A | 6/2001 |
| WO | WO 98/36949 A1 | 8/1998 |
| WO | WO 00/43727 A1 | 7/2000 |

* cited by examiner

AIR BAG SYSTEM

This nonprovisional application claims priority under 35 U.S.C. §119(e) on U.S. Provisional Application Ser. No(s). 60/359,990 filed on Feb. 28, 2002 and under 35 U.S.C. §119(a) on Patent Application Ser. No(s). 2002-16326 filed in Japan on Jan. 25, 2002, which is/are herein incorporated by reference.

BACKGROUND OF THE INVENTION

1. Field of the Invention

The present invention relates to an air bag system using a bus system.

2. Description of Related Art

An air bag system for protecting a passenger from an impact at a time of collision of a vehicle is indispensable, and the air bag system needs to be reduced in weight from a demand for reducing weight of an entire vehicle. Recently, kinds and the total number of air bags such as an air bag for a driver side, an air bag for a passenger side next to the driver, an air bag for a rear seat side, and an air bag for an side impact are increasing, and therefore, a lighter air bag system is in greater demand.

In a current air bag system, an electronic control unit (ECU) connected to a power source (a battery in a vehicle) and an impact detecting sensor are individually connected to individual gas generators (a gas generator and an air bag are accommodated in a module case). An aspect of the connection between the ECU and the individual gas generators is shown in FIG. 13.

As shown in FIG. 13, the ECU and an igniter (FIG. 14) of each of the individual gas generators are necessarily connected to each other through two conductors, and thereby, twice as many conductors than the total number of igniters are required. Having many conductors contributes largely to weight increase in an air bag system. In view of constraints at a time of assembling vehicle parts, the ECU and the individual gas generators are not connected by only the conductors but connected by connecting plural conductors via plural connectors, and thereby, there occurs a serious problem such as a weight increase due to use of the connectors and a cost increase due to increase of the number of the connectors. Further, increase in volume (weight) of the ECU due to increase in volume of a capacitor incorporated into the ECU as a backup power source for activating all the igniters (serving at a time of a failure in line between the power source and the ECU) is another serious problem.

In view of the above, a trial for reducing a conductor weight required for connection between the ECU and the individual gas generators by utilizing a bus system in the air bag system has been examined. An aspect of the air bag system utilizing this bus system is shown in FIG. 1.

As shown in FIG. 1, an air bag system is constituted by providing bus lines comprising plural loop wires passing through the ECU and connecting each of the individual gas generators to the bus line through two conductors (three or more conductors when occasion demands). In a case of such an air bag system as shown in FIG. 1, since only gas generators required corresponding to a collision situation of a vehicle are activated, an integrated circuit receiving information transmission from the ECU and a capacitor supplying a current for activating an igniter are provided in each of the individual gas generators. In the case of utilizing a bus system, the total number of capacitors is increased, but since the capacitors are distributed and arranged in the ECU and the respective igniters, the capacitance and weight of the capacitor per igniter is reduced. As a result, since the weight of the capacitors in this case is remarkably reduced as compared with the weight of the capacitors for backup in the air bag system shown in FIG. 13, a large weight reduction is achieved as the whole system in addition to largely reducing the amount of use of conductor, which is expected to be put in a practical use in the air bag system. Incidentally, there have been known JP 2000-241098A, JP 2000-513799A and Japanese Patent No. 2707250 as the prior art utilizing the bus system.

SUMMARY OF THE INVENTION

An object of the present invention is to provide an integrated circuit for an air bag system which achieves a large weight reduction in an entire air bag system by introducing a bus system into the air bag system, and which can ensure reliability and rapidness of operation similar to those in a conventional art, and which can obtain a high reliability, and an operation control method of an air bag system utilizing the same.

(1) First Solving Means

The present invention provides, as one means for solving the above problem, an air bag system comprising an ECU connected to a power source and an impact detecting sensor, and plural module cases which are connected to the ECU and accommodate plural gas generators and plural air bags, a bus line which comprises plural loop wires passing through the ECU to supply and transmit currents and required information, and individual gas generators which are connected operationally by plural conductors branched at predetermined portions from the bus line, wherein each of the plural gas generators is provided with one or at least two electric igniters including a heat generating portion and a priming coming in contact with the heat generating portion, the one or at least two igniters and the bus line are connected by plural conductors, and further a capacitor and an integrated circuit recorded with information to exhibit required functions are provided for each igniter of each gas generator, and a current for igniting the priming is supplied to the one or at least two igniters through the capacitor in the igniter, and a time period for supplying a current is the time period from the point where a current value reaches the current value corresponding to 5% of the maximum current value to the point where it is reduced down to the value corresponding to 5% of the maximum current value, which is within 500 $\mu$sec.

The numbers of the loop wires forming the bus line and the conductors for connecting the bus line and the gas generators may be two, three, or four or more, respectively, and two is preferable in view of simplifying the entire system.

The priming is not limited to a specific one, but a combination of a metal or the like and an oxidizing agent such as perchlorate is preferable, a combination of a metal such as zirconium, titanium, and hafnium and perchlorate is more preferable, and a mixture (ZPP) of zirconium and potassium perchlorate is particularly preferable. Desirably, the ZPP is formed in particle shape and particle diameters of zirconium and potassium perchlorate are adjusted.

A capacitance of the capacitor is preferably not more than 24 $\mu$F, more preferably not more than 12 $\mu$F, and further preferably not more than 6 $\mu$F.

The maximum current value in the time period for supplying a current means a current value sufficient for igniting a priming, and if the current value is not more than 5% of the maximum current value, the priming cannot be ignited.

In the case of a conventional air bag system, since a current for activating an igniter flows from a power source (a battery) with a relatively large capacitance at 1.2 A for about 2 msec, that is, at a relatively low current for a relatively long time, a waveform of an ignition current (a vertical axis denotes a current value (A) and a horizontal axis denotes a time ($\mu$sec)) becomes rectangular.

In the present invention, however, since a current for activating an igniter is supplied from a capacitor with a relatively small capacitance, it is preferable that a relatively high electric current flows for a short time, because ignition of the igniter is made smoother and ignition energy itself can be made smaller. The waveform of the ignition current at this time (a vertical axis denotes a current value (A) and a horizontal axis denotes a time ($\mu$sec)) becomes a discharging waveform expressed by the following formula (I) when discharging starts at a time of time t=0:

$$i(t)=(V0/R) \times e-t/CR \qquad (I)$$

(In the formula, v0 represents a capacitor charging voltage (V), R represents a circuit resistance ($\Omega$), C represents a capacitor capacitance ($\mu$F), t represents a time ($\mu$sec), and i represents a current (A)).

When such a discharging waveform expressed by the formula (I) is employed, a current value becomes larger than that of a conventional rectangular waveform, but a current conduction time is shortened. Therefore, the ignition energy itself is reduced largely.

In the present invention, when a period in which a stable current supplying is being maintained after reaching a desired current value is defined as t ($\mu$sec) and a period from a start of waveform rising to stopping of current supplying is defined as T ($\mu$sec), it is preferable that a relationship (t/T) between these t and T is in the range of $0 \leq t/T < 0.2$ or $0.5 < t/T < 1$.

In the case of $0 \leq t/T < 0.2$, a waveform of a current is similar to a discharging waveform (a waveform similar to a triangle) obtained when electricity stored in the capacitor is applied to the heat generating portion directly. In case of $0.5 < t/T < 1$, a waveform of a current is similar to a waveform (a waveform similar to a trapezoid) obtained when a discharging waveform is converted through a discharging waveform converting circuit (hereinafter, abbreviated as "a waveform converting circuit") for converting a waveform of a current stored in a capacitor to a signal waveform of a current for igniting the priming or the like.

The period for supplying a current is as described above, and it is preferably within 200 $\mu$sec, and more preferably within 100 $\mu$sec. Incidentally, a current value at this time varies depending on a resistance value of the heat generating portion in the igniter, and it is determined on the basis of presence or absence of the waveform converting circuit, the constitution of the waveform converting circuit, a particle diameter of a priming, a shape of the heat generating portion and the like.

In the air bag system of the above-described invention, the respective igniters of the respective gas generators are provided with a capacitor and an integrated circuit having a predetermined function, and preferably, a waveform converting circuit is further included. This waveform converting circuit functions to convert the discharging waveform represented by the formula (I) to a triangular waveform or a trapezoidal waveform. Additionally, in order to provide a similar converting function, a coil can be interposed in a connecting circuit between the capacitor and the heat generating portion, and further, the discharging waveform converting circuit can be provided in the integrated circuit in view of simplifying of the entire system.

In the air bag system of the above-described invention, a circuit for preventing the igniter from being activated erroneously due to a noise generated outside the igniter, for example, a varistor (non-linear resistance element) can be provided.

In the above invention, as the integrated circuit recorded with information to exhibit required functions, the one recorded with information for exhibiting one or at least two functions selected from the group of a function for detecting abnormality of the heat generating portion of the igniter in the gas generator, a function for identifying each of the plural gas generators and a function for detecting a malfunction of the capacitor can be used. It is further preferable that a circuit (a circuit which exhibits a noise preventing function) for preventing the igniter from being activated erroneously due to a noise generated outside the igniter is provided in the igniter.

Usually the integrated circuit is provided with a basic function to activate a proper gas generator for protecting the passenger according to a situation of a vehicle collision upon receiving a signal from the ECU. In addition thereto, by providing the above various functions, quality check of a product at a time of shipping, workability at a time of assembling and safety at an actual use (while driving a vehicle) and the like can be improved properly.

(2) Second and Third Solving Means

The present invention provides, as one means for solving the above problem, an air bag system comprising an ECU connected to a power source and an impact detecting sensor, and plural module cases which are connected to the ECU and accommodate plural gas generators and plural air bags, a bus line which comprises plural loop wires (for example, two or three or four or more, preferably two wires) passing through the ECU to supply and transmit currents and required information, and individual gas generators which are connected operationally by plural conductors branched at predetermined portions from the bus line, wherein each of the plural gas generators is provided with one or at least two electric igniters including a heat generating portion and a priming coming in contact with the heat generating portion, the one or at least two igniters and the bus line are connected by plural conductors (for example, two or three or four or more, preferably two conductors), a capacitor, an integrated circuit in which information for developing a required function is stored, and the heat generating portion is provided on one substrate in each igniter of each gas generator, and the substrate is provided vertically, and on the substrate, at least the capacitor and the integrated circuit are not in contact with the priming, and a current for igniting a priming is supplied to the one or at least two igniters through the capacitor in the igniter.

Further, the present invention provides, as one means for solving the above problem, an air bag system comprising an electronic control unit connected to a power source and an impact detecting sensor, and plural module cases which are connected to the electronic control unit and accommodate plural gas generators and plural air bags, a bus line which comprises plural loop wires (for example, two or three or four or more, preferably two wires) passing through the electronic control unit to supply and transmit currents and required information, and individual gas generators which are connected operationally by plural conductors branched at predetermined portions from the bus line, wherein each of the plural gas generators is provided with one or at least two electric igniters including a heat generating portion and a priming coming in contact with the heat generating portion, the one or at least two igniters and the bus line are connected by plural conductors (for example, two or three or four or more, preferably two conductors), each igniter of each gas generator has a capacitor and an integrated circuit in which information for developing a required function on one substrate, and the substrate is provided vertically, a header, which supports an electroconductive member for supplying and transmitting a current between the substrate and the heat generating portion, sections vertically between the substrate and the priming, and the substrate is arranged below the header and the heat generating portion is arranged above the header, and a current for igniting the priming is supplied to one or at least two igniters through the capacitor in the igniter. In this case, as long as the heat generating portion is provided above the header, it may be acceptable that the heat generating portion is provided on a header surface or over the header, separated from the header surface.

In the air bag system of the above-described invention, the respective igniters of the respective gas generators are provided with a capacitor and an integrated circuit having a required function, and preferably, a waveform converting circuit is further provided.

In the above invention, the integrated circuit (and the waveform converting circuit, if required) is provided on one surface of the substrate and the capacitor (and the waveform converting circuit, if required) is provided on the other surface. The heat generating portion may be provided on either surface, but desirably, it is provided on the same surface as the integrated circuit to facilitate circuit formation (a soldering work). Further, if the waveform converting circuit is provided, preferably, it is provided in the integrated circuit in view of simplifying the entire system.

In the above invention, such a structure can be employed that the substrate is fitted to penetrate a header for forming a priming holding space together with a cup member for holding the priming, and the capacitor and the integrated circuit are positioned below the header, and the heat generating portion projects above the header to come into contact with the priming.

When the heat generating portion is provided on the header, various method can be employed such that a method for welding a wire for heat generation comprising a platinum/tungsten alloy, nickel/chrome alloy or the like on the header to fix the heat generating portion, a method for forming the heat generating portion by etching after pasting a foil comprising the alloy on an insulating substrate comprising an aluminum with oxidized coating, a glass, epoxy resin, phenol resin, polyimide or the like, a method for forming the heat generating portion by performing vapor deposition of an electroconductive material on a pattern-masked insulating substrate, or a method for printing electrical electroconductive material on an insulating substrate.

By providing the integrated circuit and the capacitor on different surfaces of the substrate in this manner, a compact structure can be achieved as compared with a case of providing on one surface. Further, by providing the priming above the header and providing the substrate below the header, the integrated circuit or the capacitor does not come in contact with the priming, so that pollution of the capacitor or the integrated circuit due to the priming can be prevented and, in addition thereto, a possibility of erroneous activation of the igniter can also be eliminated.

In the above invention, such a structure can be employed that the integrated circuit and the capacitor (and the discharging waveform converting circuit, if required) are provided on one surface of the substrate. The heat generating portion may be provided on either surface, but desirably, it is on the same surface as the integrated circuit and the capacitor.

In the above invention, such a structure can be employed that a portion of the substrate except for the heat generating portion is sealed with thermoplastic resin containing glass fibers, thermosetting resin such as epoxy resin, organic and inorganic insulating material such as glass, and the heat generating portion is in contact with the priming. When a substrate having such a structure is used, the substrate exists above the header for supporting pins which serve as interposing members to supply and transmit a current and required information to the integrated circuit and the capacitor.

In case of employing such a structure, the capacitor and the integrated circuit are protected and the capacitor and the integrated circuit do not come in contact with the priming, and thereby, pollution of the capacitor and the integrated circuit due to the priming can be prevented.

In the above invention, an electroconductive pattern is formed on a substrate by etching, including connecting portions which connect the integrated circuit with the heat generating portion, the capacitor and the bus line, and also including the heat generating portion of the igniter. At this time, the conductor pattern forming the connecting portions which connect the integrated circuit with the heat generating portion, the capacitor and the bus line can be two routes for each connecting portion, i.e., the total six routes as shown in FIG. 8 and FIG. 9. Incidentally, as the etching, wet etching, dry etching (plasma etching, sputter etching, reactive ion etching) photo etching or the like can be applied.

When such conductor patterns are used, the number of connecting portions obtained by soldering is reduced as compared with a case of connecting all of the integrated circuit, the heat generating portion and the capacitor with a conductor and soldering the connecting portions. As a result, a possibility of a malfunction in activation due to a resistance value and a loose connection is decreased, which is preferable. Furthermore, by providing such conductor patterns, a wiring is facilitated, and manufacturing is made easier as compared with a case of providing a bridge wire as the heat generating portion.

(3) Fourth Solving Means

The present invention provides, as one means for solving the above problem, an air bag system comprising an ECU connected to a power source and an impact detecting sensor, and plural module cases which are connected to the ECU and accommodate plural gas generators and plural air bags, a bus line which comprises plural loop wires (for example, two or three or four or more, preferably two wires) passing through the ECU to supply and transmit currents and required information, and individual gas generators which are connected operationally by plural conductors branched at predetermined portions from the bus line, wherein each of the plural gas generators is provided with one or at least two electric igniters including a heat generating portion and a priming coming in contact with the heat generating portion, the one or at least two igniters and the bus line are connected by plural conductors (for example, two or three or four or more, preferably two conductors), and each igniter of each gas generator is provided with an integrated circuit in which information for exhibiting a function for detecting abnormality of the heat generating portion. In this case, the capacitor can be provided together with the integrated circuit and the heat generating portion, and abnormality of the heat generating portion of the igniter to be detected includes failure in line or a loose connection between the heat generating portion and the priming, or abnormality of a resistance value of the heat generating portion and the like.

As one of the requirements for normal activation of the gas generator, the heat generating portion of the igniter and the priming have to be connected properly (the heat generating portion and the priming are brought in pressure-contact with each other). For example, if there is a gap between the heat generating portion and the priming, such malfunctions may be occur that, though the igniter is actuated, the priming is not ignited or a ignition is delayed. Further, similar malfunctions may occur when the heat generated portion is disconnected or is connected loosely. For this reason, by recording information for detecting the malfunction in the integrated circuit, an inferior product can be eliminated at a time of shipping, and by detecting abnormality at a practical use (while driving a vehicle), a prompt exchange can be performed.

Detecting theory for abnormality of the heat generating portion (Thermal Transient Test; issued on pages 461 to 478 in "Progress of International Pyrotechnic Seminar " on July 1980 by A. C. Munger) is as follows: when contacting state of a heat generating portion and a priming is good, most part of calorie generated by flowing of a constant current is conducted to the priming, so that the temperature of the heat generating portion does not rise so high. On the other hand, when the contacting state of the heat generating portion and the priming is bad, transfer of heat is less, so that the temperature rising of the heat generating portion becomes higher than a normal case. Therefore, a malfunction is detected by detecting a temperature change due to such a difference in contacting state as a resistance value change and utilizing a temperature coefficient of metal resistance $[r=r0(1+\alpha\Delta T)]$ to obtain the temperature of the heat generating portion. More specifically, after a resistance r is measured when a current i which is too weak to raise the temperature up to igniting the igniter, a resistance R is measured when a current I of 10 to 15 times of the current i is flowed (the temperature of the heat generating portion becomes about 50 to 100° C., but the priming is not ignited with such a temperature), so that the resistance change due to the temperature change of the heat generating portion is obtained as a voltage change with comparisons of I and i and of R and r. Thus, such measurement information is recorded in the integrated circuit.

When abnormality of the heat generating portion is detected by using the air bag system of the above invention, such a method can be employed that abnormality of the heat generating portion of the igniter is detected based on the information inputted in the integrated circuit by supplying and transmitting a current and a command from the ECU to the integrated circuit via a bus line in a normal state in which the gas generator is not activated (4) Fifth Solving Means The present invention provides, as one means for solving the above problem, an air bag system comprising an ECU connected to a power source and an impact detecting sensor, and plural module cases which are connected to the ECU and accommodate plural gas generators and plural air bags, a bus line which comprises plural loop wires (for example, two or three or four or more) passing through the ECU to supply and transmit currents and required information, and individual gas generators which are connected operationally by plural conductors branched at predetermined portions from the bus line, wherein each of the plural gas generators is provided with one or at least two electric igniters including a heat generating portion and a priming coming in contact with the heat generating portion, the one or at least two igniters and the bus line are connected by plural conductors (for example, two or three or four or more), and each igniter of each gas generator is provided with an integrated circuit for recording information for exhibiting a function for identifying each of the plural gas generators. In this case, the capacitor and/or the heat generating portion can be provided together with the integrated circuit.

In the above invention, it is preferable to input the information for exhibiting the function for identifying each of the plural gas generators after assembling the gas generators, and it is more preferable to input the information after assembling the gas generators into the module cases, and it is further preferable to input the information after mounting the modules to a vehicle.

For the gas generator for an air bag, various kinds of gas generators such as one for a driver side, one for a passenger side next to the driver, one for a side impact (for a side collision), one for a curtain air bag and the like have been practically used. For example, in the case of the gas generator for a side impact, the total four gas generators are mounted for a driver side, a passenger side next to the driver, two rear seat sides respectively. For this reason, though different information pieces are recorded in the respective integrated circuits of the gas generators for the driver side, for the passenger side next to the driver, and for two rear seat sides, when these information pieces are recorded at a time of assembling the igniters or the gas generators or before assembling, since the igniters or the gas generators have the same appearance, it is necessary to distinguish the gas generators having the same appearance and having different information pieces recorded or the igniters having the same appearance before assembling such that a wrong one is not taken to store and transport them, which becomes much complicated. Furthermore, with one for a driver side mounted to a vehicle erroneously as one for a passenger side next to the driver, when activation information of an air bag for a driver side is sent from the ECU, such an erroneous activation that an air bag for a passenger side next to the driver is inflated occurs eventually.

Therefore, by recording of information for developing function for identifying each plurality of gas generators after assembling of gas generators (when differences of gas generators can be recognized apparently), after gas generators are assembled in module cases (when differences of module cases can be recognized apparently) or after gas generators are mounted to a vehicle, storage, transportation, management and the like of gas generators can be made easy, so that a mistake or a confusion is prevented from occurring at a time of mounting of gas generators.

When the function for identifying each of the plural gas generators is exhibited by using the air bag system of the above invention, such a method can be employed that the function for identifying each of the plural gas generators is exhibited based on the information inputted in the integrated circuit by supplying and transmitting a current and a command from the ECU to the integrated circuit via a bus line in a normal state in which the gas generator is not activated

(5) Sixth Solving Means

The present invention provides, as one means for solving the above problem, an air bag system comprising an ECU connected to a power source and an impact detecting sensor, and plural module cases which are connected to the ECU and accommodate plural gas generators and plural air bags, a bus line which comprises plural loop wires (for example, two or three or four or more, preferably two wires) passing through the ECU to supply and transmit currents and required information, and individual gas generators which are connected operationally by plural conductors branched at predetermined portions from the bus line, wherein each of the plural gas generators is provided with one or at least two electric igniters including a heat generating portion and a priming coming in contact with the heat generating portion, the one or at least two igniters and the bus line are connected by plural conductors (for example, two or three or four or more, preferably two conductors), and each igniter of each gas generator is provided with an integrated circuit in which information to exhibit a function for detecting the capacitor and a malfunction of the capacitor is recorded. In this case, the heat generating portion can be provided together with the capacitor and the integrated circuit.

The information for developing a function for detecting a malfunction of the capacitor also includes confirmation information of a mounted state (soldered state) of a capacitor to a substrate and the like in addition to information for measuring a pulse response or a dielectric dissipation factor.

After mounted to the vehicle, since the capacitor repeats charging and discharging, the capacitor deteriorates with age. However, abnormality is detected at a time of a practical use (while driving a vehicle) by recording information which can confirm a malfunction due to this deterioration in the integrated circuit in advance, so that a prompt exchange can be performed. Furthermore, by recording information for confirming the soldered state in advance, an inferior product can be removed at a time of shipping.

When the function for detecting a malfunction of the capacitor is exhibited by using the air bag system of the above invention, such a method can be employed that the function for detecting a malfunction of the capacitor is exhibited based on the information inputted in the integrated circuit by supplying and transmitting a current and a command from the ECU to the integrated circuit via a bus line in a normal state in which the gas generator is not activated.

(6) Seventh Solving Means

The present invention provides, as one means for solving the above problem, an air bag system comprising an ECU connected to a power source and an impact detecting sensor, and plural module cases which are connected to the ECU and accommodate plural gas generators and plural air bags, a bus line which comprises plural loop wires (for example, two or three or four or more, preferably two wires) passing through the ECU to supply and transmit currents and required information, and individual gas generators which are connected operationally by plural conductors branched at predetermined portions from the bus line, wherein each of the plural gas generators is provided with one or at least two electric igniters including a heat generating portion and a priming coming in contact with the heat generating portion, the one or at least two igniters and the bus line are connected by plural conductors (for example, two or three or four or more, preferably two conductors), and further, each igniter of each gas generator is provided with an integrated circuit inputted with information to exhibit required functions, and the inside of the igniter is provided with a circuit for preventing the igniter from being erroneously activated due to a noise generated outside the one or at least two igniters.

For example, when a large current flows at a time of activating a cell motor in a vehicle, in case of not providing a noise preventing circuit, there is a possibility that a noise (a noise causing an uncomfortable unusual sound occurrence while listening to the radio) generated due to this current is transmitted from a vehicle body to flow in an igniter. Due to that the noise is transmitted in this manner, a possibility that an igniter causes an erroneous activation becomes high. Accordingly, by mounting a device constituted to prevent a current from flowing from a vehicle side to an igniter side, for example, a diode or a varistor (a non-linear resistance element) as a noise preventing means (a circuit for preventing an igniter from being activated erroneously), the above-described erroneous activation of the igniter can be prevented.

(7) Eighth Solving Means

The present invention provides, as another solving means for the above problem, an air bag system wherein at least two igniters share one capacitor and one integrated circuit inputted with information to exhibit required functions when the air bag system of the above invention has at least two igniters for each of the plural gas generators.

The at least two igniters share one capacitor and one integrated circuit inputted with information for exhibiting required functions, and further, they share a discharging waveform converting circuit which is provided, if required, to convert a signal waveform of a current for igniting the priming stored in the capacitor for each igniter. And thereby, the entire system can further be reduced in weight. In this case, the discharging waveform converting circuit may be assembled into the integrated circuit.

(8) Ninth Solving Means

The present invention provides, as another means for solving the problem, an air bag system wherein each igniter has a capacitor and an integrated circuit inputted with information to exhibit required functions, and further has two pins for supplying and transmitting a current and required information to at least two igniters from the bus line when the air bag system of the above invention has at least two igniters for each of the plural gas generators.

According to the air bag system of the present invention, by using the bus system, the whole weight of the air bag system can be reduced largely, and an operation performance similar to the conventional one can be secured.

DETAILED DESCRIPTION OF THE INVENTION

Embodiments of the Present Invention

An air bag system of the present invention achieves reduction in weight of the entire system by using a bus line and achieves reliability of an operation of the system by the above-described solving means. Embodiments including the above-described first to ninth solving means will be explained below. In this case, the order of the solving means and the order of embodiments do not coincide with each other necessarily.

(1) First Embodiment

Figure 1:
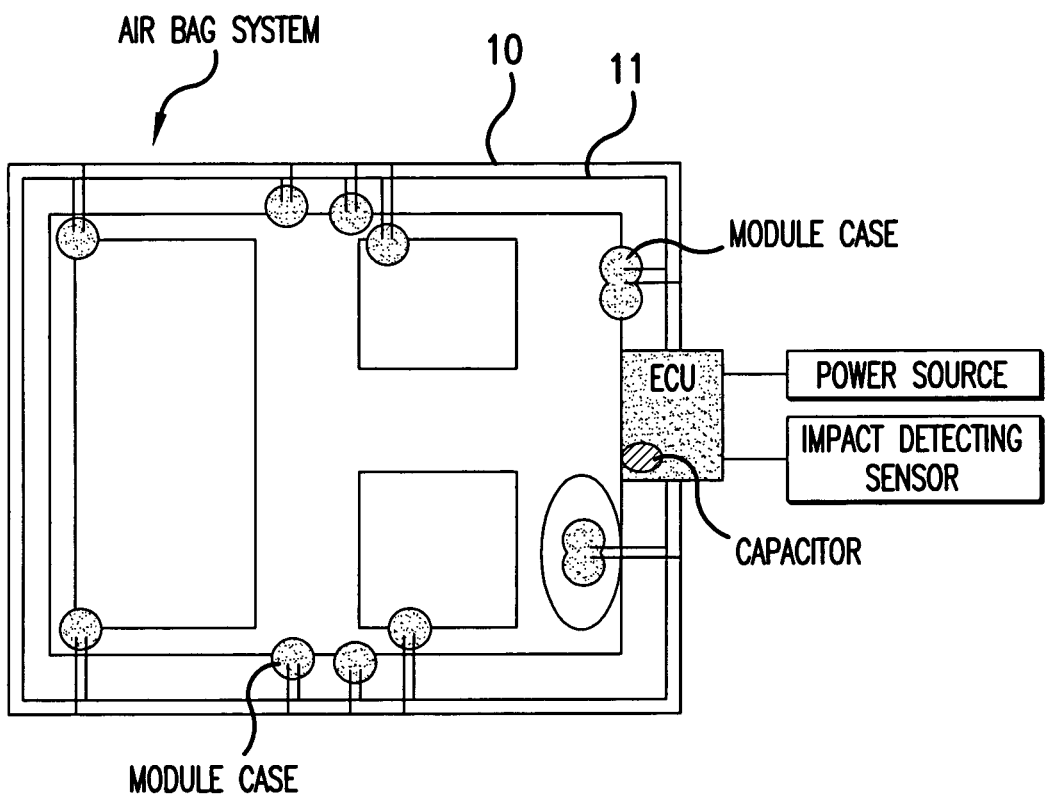
FIG. 1 is a diagram of an air bag system of the present invention.
Figure 13:
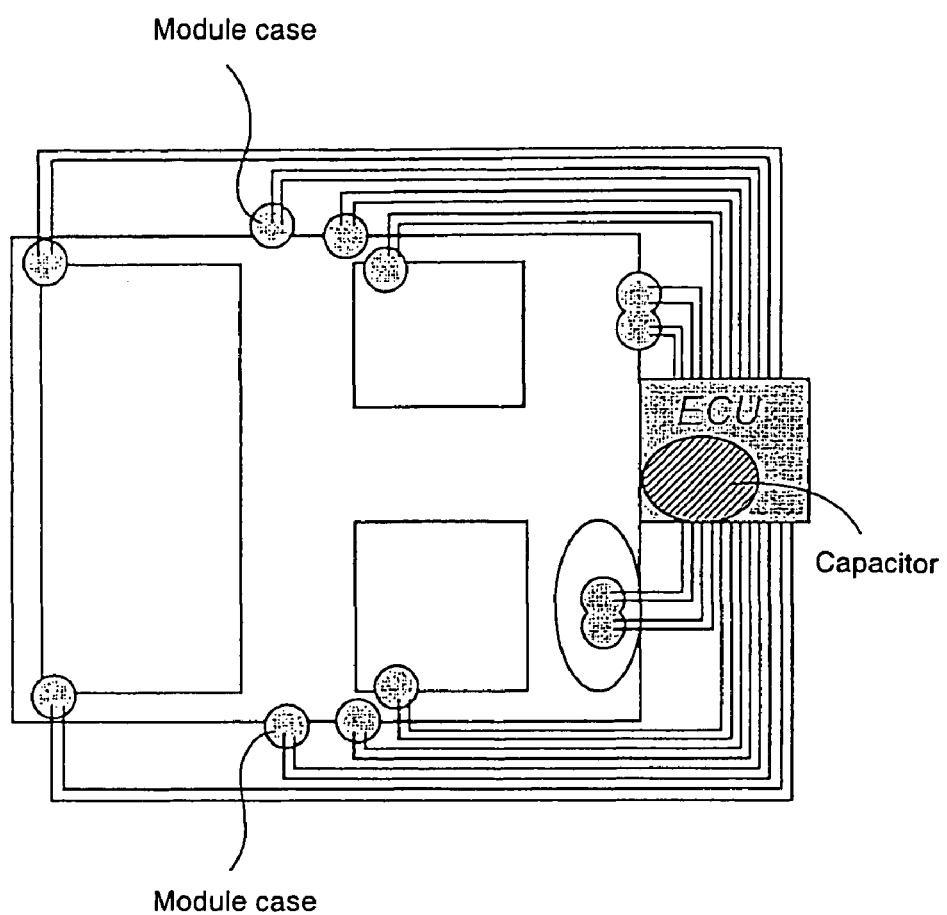
FIG. 13 is a diagram of a conventional air bag system.
Figure 14:
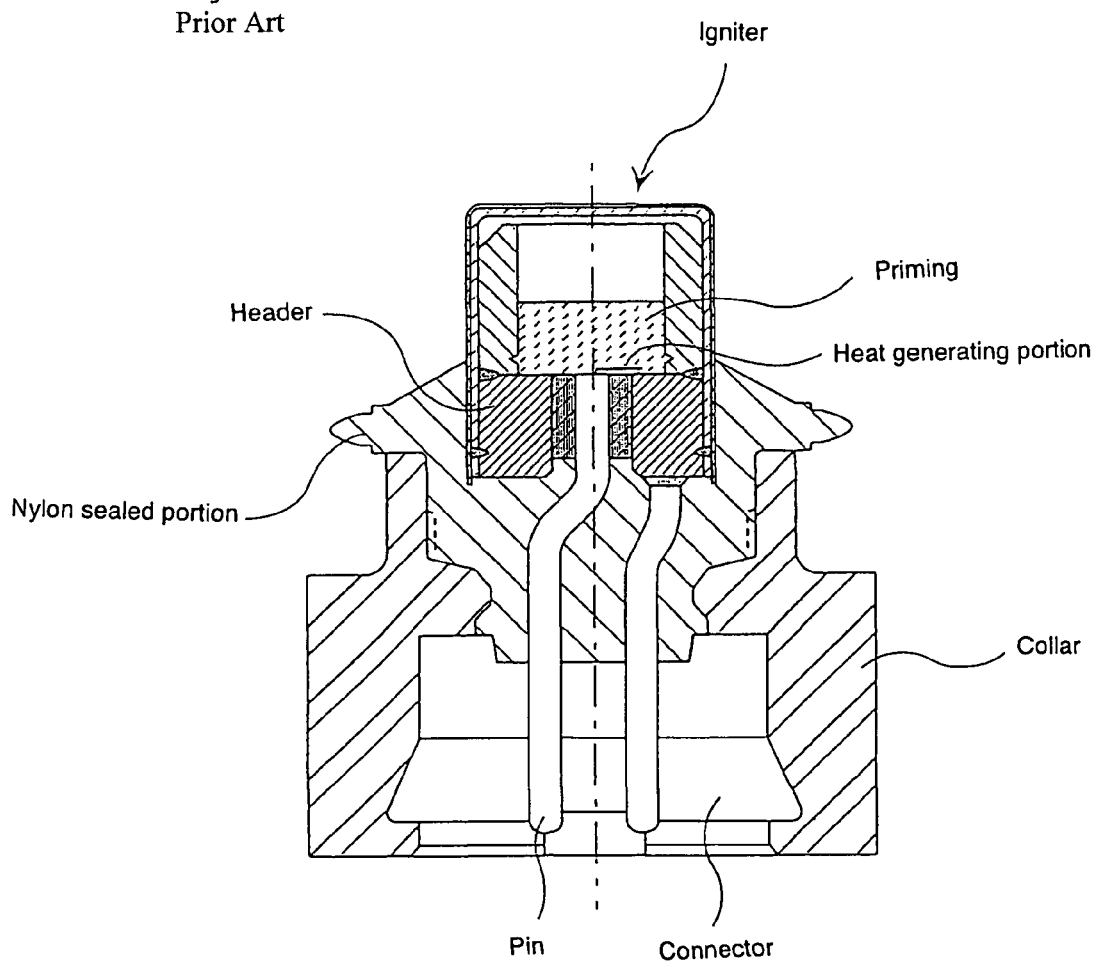
FIG. 14 is a vertical sectional view of an igniter used in the conventional air bag system.

As shown in FIG. 1, an air bag system of the present invention uses bus lines 10 and 11 comprising two loop wires passing through an ECU. The ECU is connected to a power source (a battery in a vehicle) and an impact detecting sensor which are not illustrated, and a capacitor for backup, when a conductor connecting the ECU and the power source is disconnected by an impact at a collision of a vehicle, is disposed. Incidentally, in the air bag system of the present invention, since the capacitor is disposed at each of respective gas generators (igniters), the capacitor for backup may be one with a small capacitance (i.e., light weight). By contrast, the capacitor serving for backup in the conventional air bag system shown in FIG. 13 has to have a large capacitance in order to activate all the gas generators by itself at a time of failure in line of a lead wire between the battery and the ECU.

The bus lines 10 and 11 and gas generators in a required number of module cases (which are indicated by black circles. The gas generator and an air bag are accommodated in the case.) mounted to a vehicle are connected by two conductors (or three or more conductors when occasion demands), such that the gas generators can be operational individually.

Figure 2:
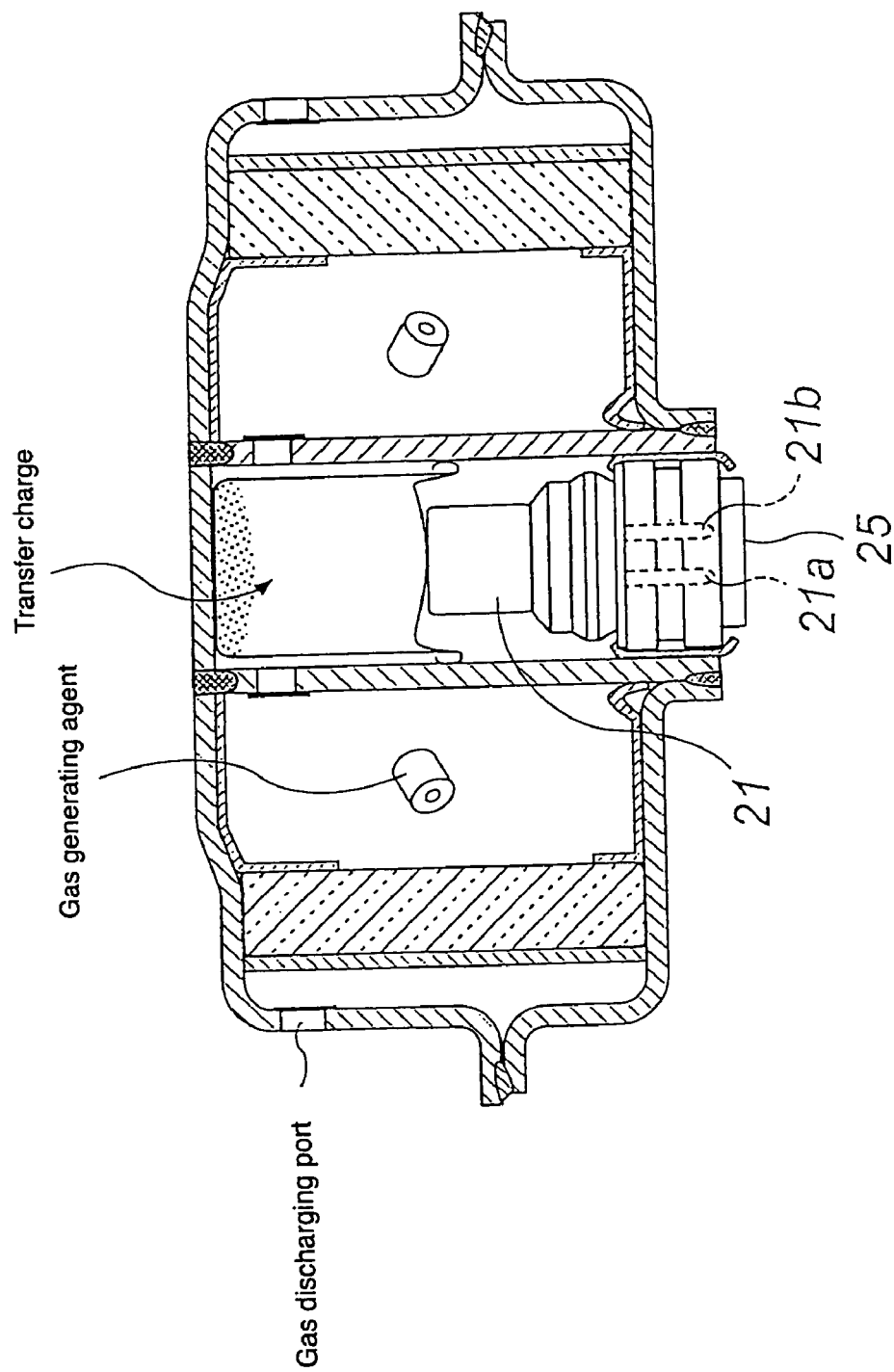
FIG. 2 is an axial sectional view of a gas generator (including one igniter) used in the air bag system of the present invention.
Figure 3:
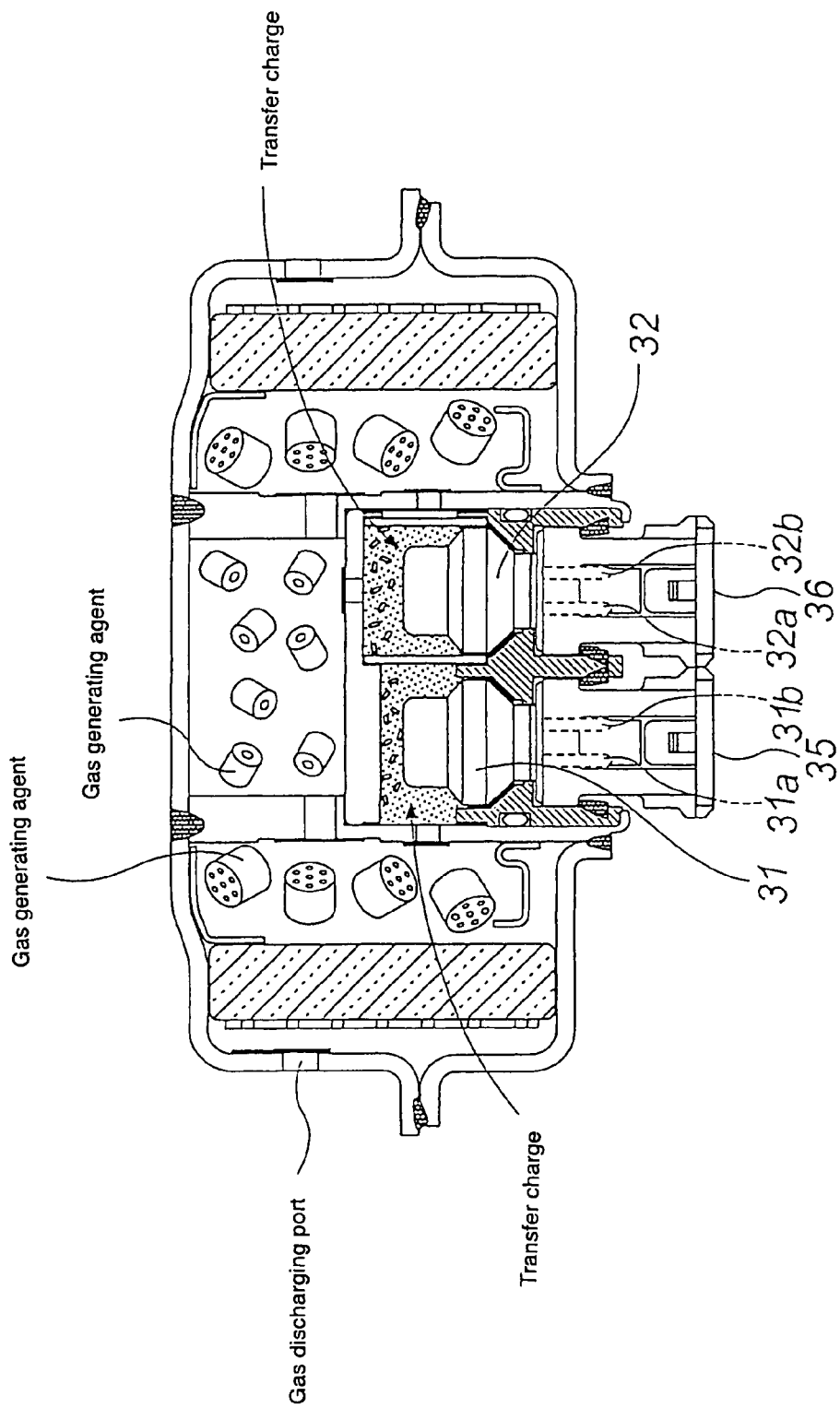
FIG. 3 is an axial sectional view of a gas generator (including two igniters) used in the air bag system of the present invention.

As the gas generators in the module cases illustrated with black circles in the air bag system shown in FIG. 1, ones shown in FIG. 2 or FIG. 3 can be used according to the number of the igniters. FIG. 2 is an axial sectional view of a single type gas generator (an igniter 21) in which one igniter is provided, and FIG. 3 is an axial sectional view of a dual type gas generator (igniters 31 and 32) in which two igniters are provided.

In the single type gas generator, two (or three or more when occasion demands) pins 21a and 21b are provided in the igniter 21 and they are connected to the bus lines 10 and 11 through a connector 25.

In the dual type gas generator, two (or three or more when occasion demands) pins 31a and 31b are provided in an igniter 31, two (or three or more when occasion demands) pins 32a and 32b are provided in an igniter 32, and the igniters are respectively connected to the bus lines 10 and 11 through respective connectors 35 and 36.

Figure 4:
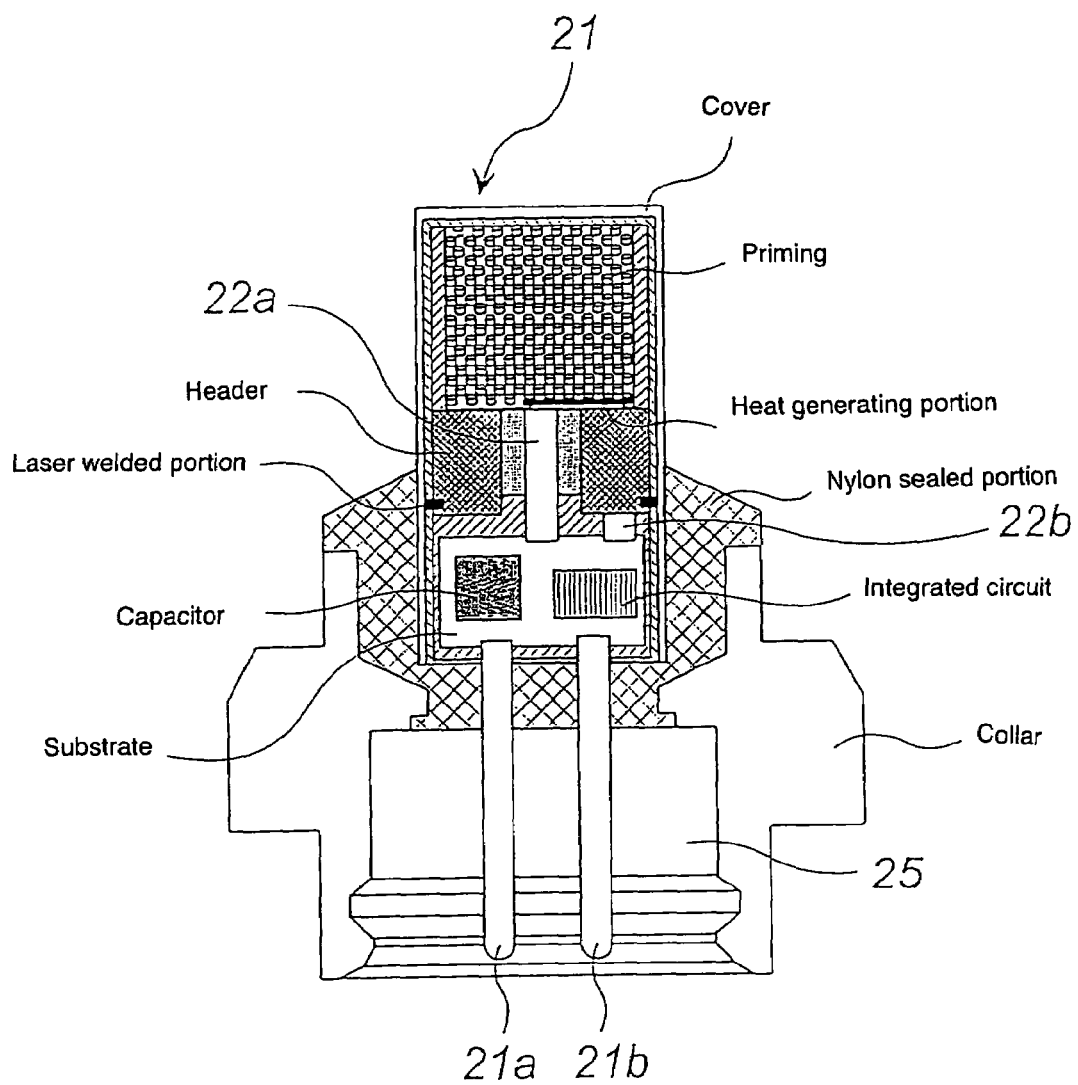
FIG. 4 is a vertical sectional view of an igniter used in the air bag system of the present invention.

As the igniter 21 and the igniters 31 and 32 in the gas generators shown in FIG. 2 and FIG. 3, for example, one shown in FIG. 4 can be used. FIG. 4 shows vertical schematic sectional views of igniters, and since igniters having the same structure can be used as the igniter 21, the igniters 31 and 32, the igniter 21 will be explained below.

A heat generating portion is provided on a glass header, an igniting agent (for example, ZPP) is charged to come in pressure-contact with the heat generating portion, and a substrate provided with a capacitor and an integrated circuit in which information for developing required functions has been recorded is disposed in a lower portion of the igniter 21. The integrated circuit, and the heat generating portion and the capacitor are respectively connected by two conductors, and the integrated circuit is further connected to the pins 21a and 21b through conductors.

The integrated circuit is recorded with information to inflate a required air bag when a command is received from the ECU at least upon a collision of a vehicle. In addition, information for developing one or at least two functions, when required, for example, selected from the group of a function for detecting abnormality of the heat generating portion of the igniter in the gas generator, a function for identifying each of the plural gas generators and a function for detecting a malfunction of the capacitor can be recorded in the integrated circuit.

Figure 5:
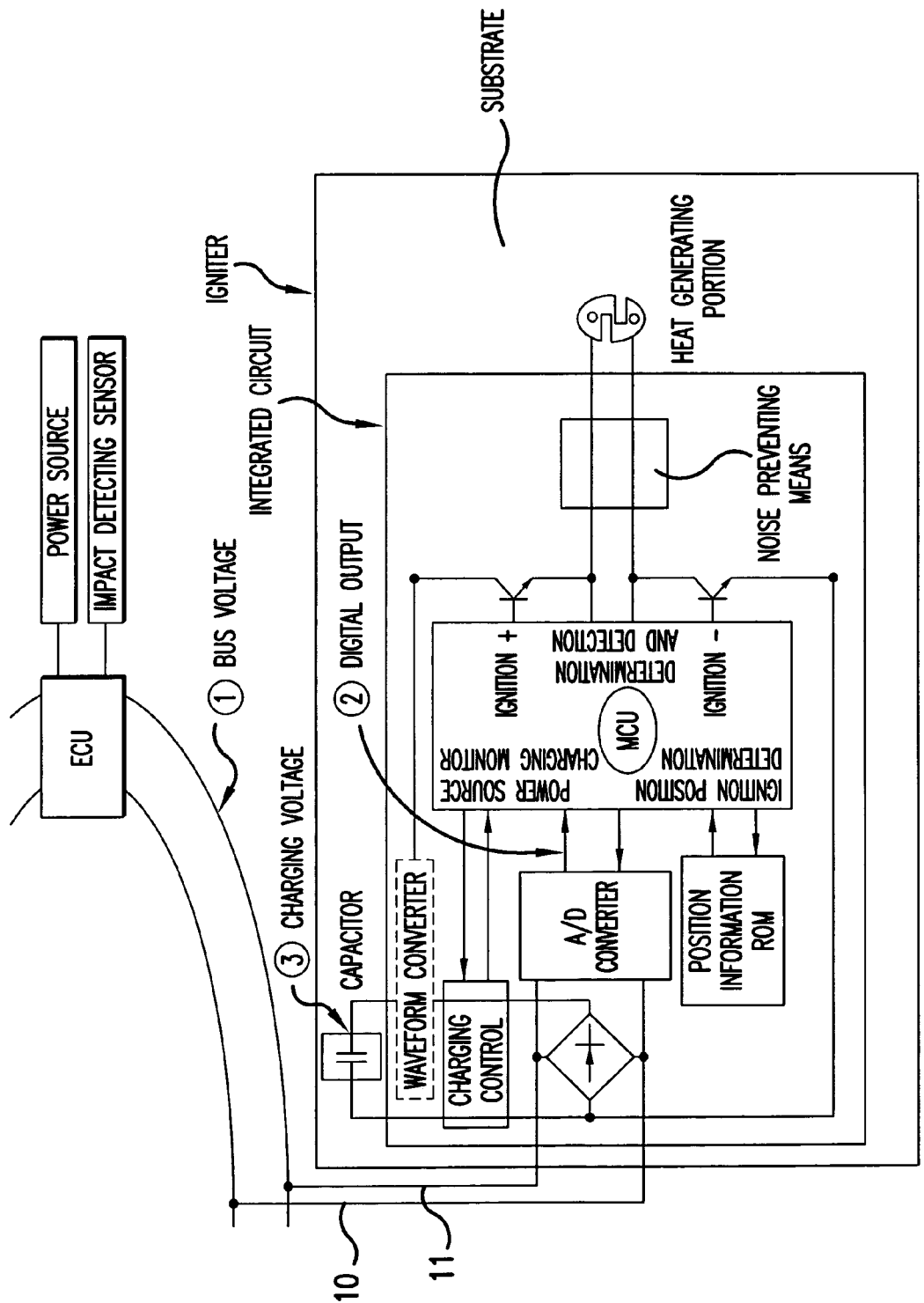
FIG. 5 is a conceptual diagram of an igniter used in the air bag system of the present invention.
Figure 6:
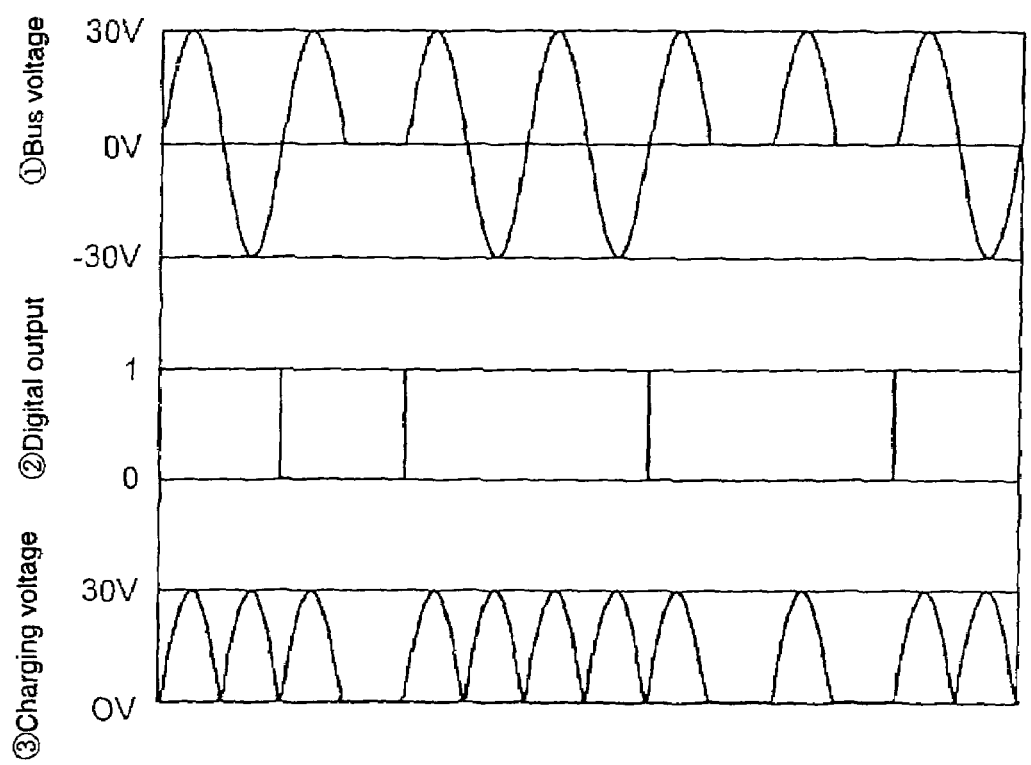
FIG. 6 is a pulse waveform diagram of a bus voltage, a digital output and a charging voltage shown in FIG. 5.

The substrate in the igniter, as shown in FIG. 4, that is provided with the capacitor or the integrated circuit may be constituted to have each of structures shown with the conceptual diagrams in FIG. 5. Incidentally, FIG. 6 shows pulse waveforms of a bus voltage, a digital output and a charging voltage shown in FIG. 5.

The capacitor and the integrated circuit are provided on the substrate, a waveform converting circuit can be provided thereon, if required, and the waveform converting circuit itself can be incorporated into the integrated circuit.

The integrated circuit and the capacitor on the substrate are connected to the bus lines 10 and 11 through the pins 21a and 21b. After a current and information supplied from the bus lines 10 and 11 are sent to the integrated circuit, they are converted to digital outputs by an A/D converter (an analog/digital converter) to be sent to an MCU (a Micro Computer Unit). Thereafter, a command is sent from the MCU such that charge control information, position identification information, failure-detecting information of a heat generating portion or a resistance value change detecting information is exhibited, and also, the current is used for charging the capacitor, but it is not used for making the heat generating portion generate heat.

A varistor (non-linear resistance element) is disposed in a circuit between the MCU and the heat generating portion as noise preventing means, and it serves such that the igniter is not activated erroneously due to a noise generated outside the igniter.

The heat generating portion is put in contact with the priming, and it generates heat by a current supplied only from the capacitor to ignite the priming.

Next, an operation of the air bag system employing the present invention will be explained with reference to FIG. 1 and FIG. 5.

When a vehicle is running normally, failure-detecting information or resistance value change detecting information of the heat generating portion, detecting information for a malfunction of the capacitor, and detecting information about whether or not an igniter including an identifying function required for activating a gas generator (detecting information about whether or not an igniter having an identification function for activating a gas generator required for a driver side, a passenger side next to the driver or the like properly at a time of collision is disposed rightly, or whether or not another igniter having the same identifying function is disposed in a duplicated manner) is sent from the ECU to the gas generator (the integrated circuit arranged in the igniter) through the bus lines so that whether or not there is abnormality in these members is checked. When there is an abnormality, an alarm lamp activated in linkage with the air bag system, or the like informs the abnormality, so that an early exchange of parts can be conducted to recover the safety. Further, the capacitor of each igniter can be charged from the power source.

When a vehicle provided with the air bag system collides, information from the impact detecting sensor is sent to the ECU, and information from ECU is sent, via the bus lines 10 and 11, to a gas generator (the integrated circuit provided in the igniter) required to inflate an air bag for ensuring a safety for a vehicle occupant.

Upon receiving this information, a required current is supplied from the capacitor for a predetermined time period (from the point where a current value reaches the current value corresponding to 5% of the maximum current value to the point where the current value is reduced to 5% of the maximum current value which is only within 500 μsec), and the heat generating portion generates heat to ignite and burn the priming. At this time, the waveform of the current forms a discharging waveform represented by the formula (I) when a discharging starts at a time t=0. By igniting and burning the priming, a transfer charge in FIG. 2 or FIG. 3 and further the gas generating agent are ignited and burnt to generate a gas. The gas is discharged from gas discharging ports to inflate an air bag accommodated in the module case together with the gas generator.

One of the characteristic features of an air bag system of this embodiment lies in a structure of a substrate on which the integrated circuit and the like is arranged, a state of the disposition or the like.

First, a structure of a substrate will be explained. As shown in FIG. 5, a capacitor, an integrated circuit recorded with information to exhibit required functions and a heat generating portion are provided on the substrate, and these members can be arranged on one surface or both surfaces of the substrate.

Figure 7:
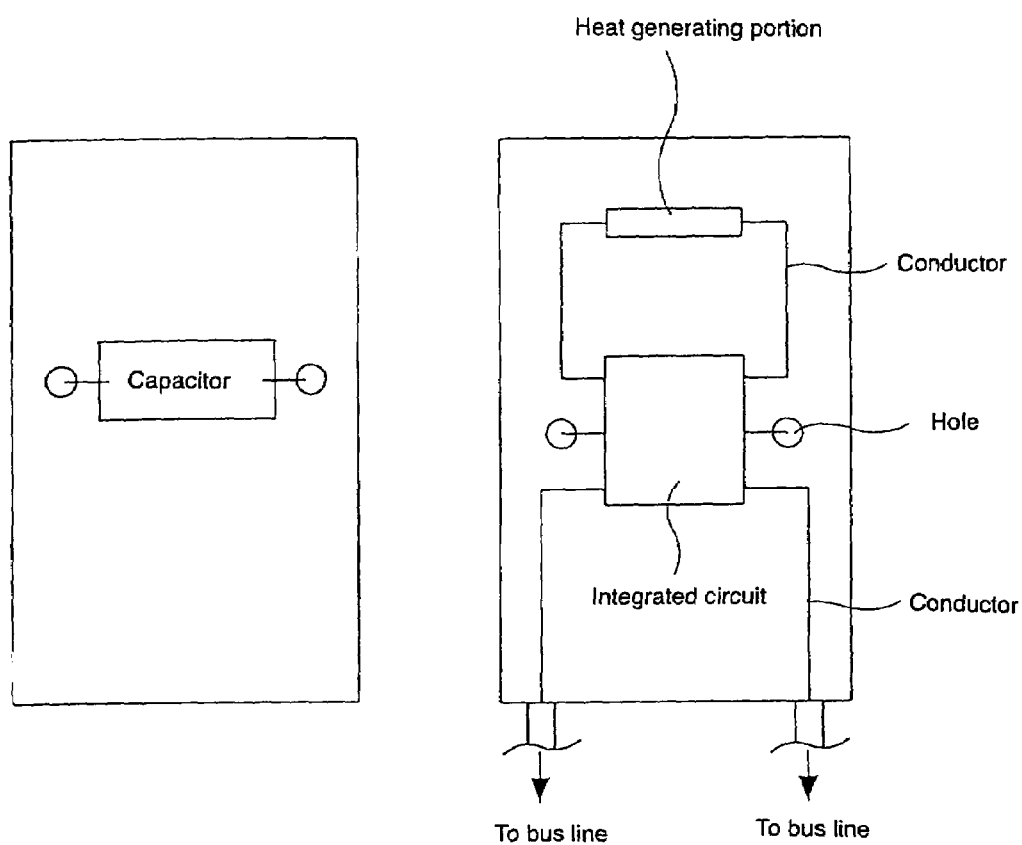
FIG. 7 is a plan view of both surfaces of a substrate (respective elements are arranged on both surfaces) provided in an igniter used in the air bag system of the present invention.

As shown in FIG. 7, such a structure can be employed that the integrated circuit and the heat generating portion are provided on one surface of the substrate, and the capacitor is provided on the other surface. When this structure is employed, the capacitor and the integrated circuit are connected through two conductors inserted into two holes, and the integrated circuit and the heat generating portion are connected through two conductors. The integrated circuit is also connected to the bus lines 10 and 11 through two conductors, pins of the igniters or the like.

Figure 8:
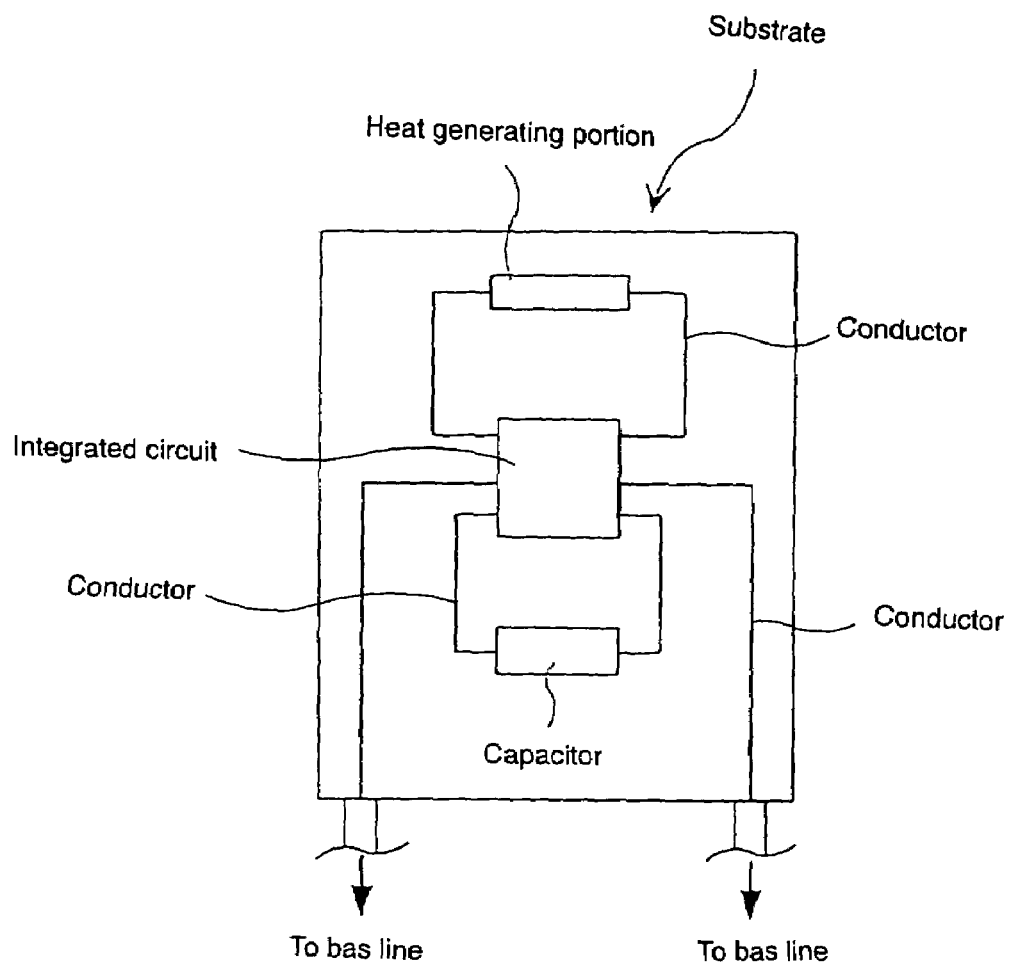
FIG. 8 is a front view of a substrate (respective elements are arranged on one surface) provided in an igniter used in the air bag system of the present invention.

As shown in FIG. 8, such a structure can be employed that the integrated circuit, the heat generating portion and the capacitor are arranged on one surface of the substrate. The integrated circuit, the capacitor and the heat generating portion are connected by two conductors respectively, and the integrated circuit is also connected to the bus lines 10 and 11 through two conductors, pins of the igniters or the like.

Figure 9:
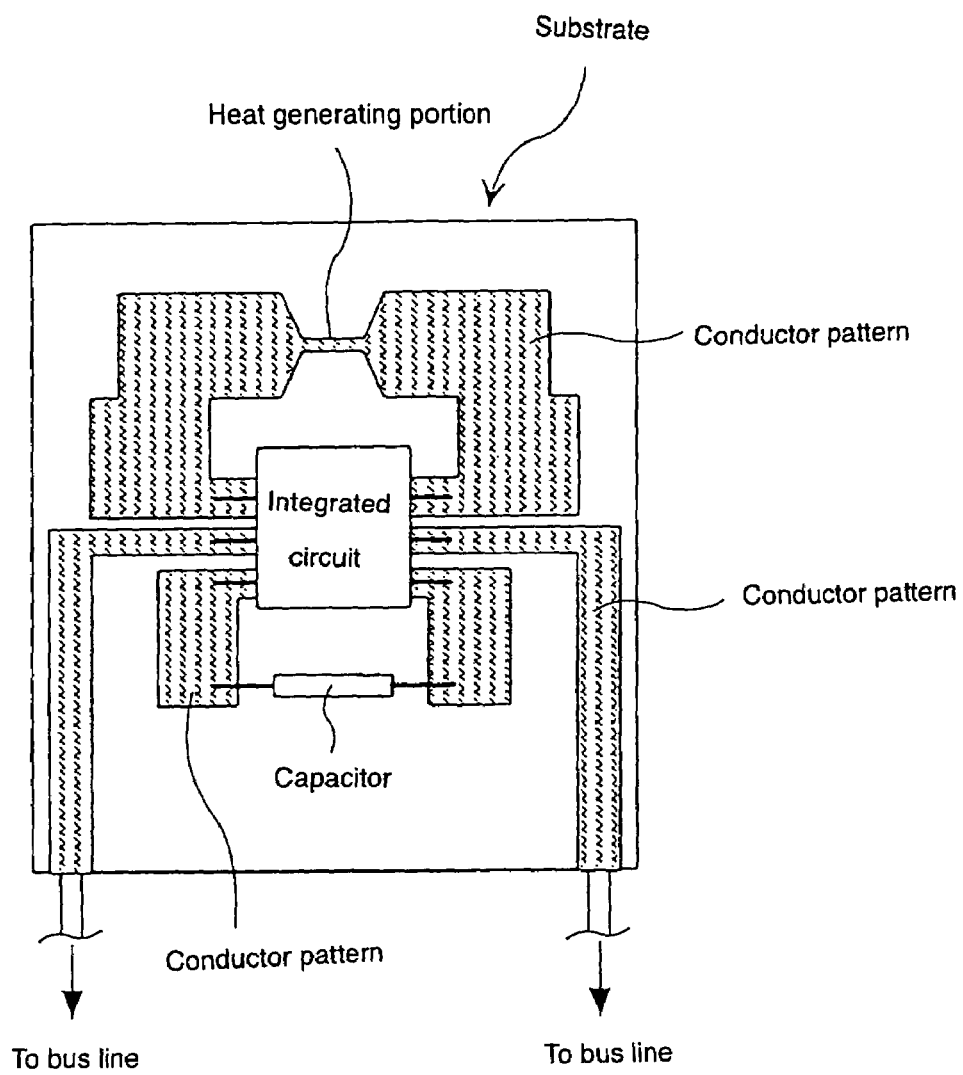
FIG. 9 is a front view of another embodiment of a substrate (respective elements are arranged on one surface) provided in an igniter used in the air bag system of the present invention.

An electroconductive pattern is formed on the substrate by etching, including connecting portions, shown in FIG. 7 and FIG. 8, which connect the integrated circuit with the heat generating portion, the capacitor and the bus line, and the heat generating portion as shown in FIG. 9. By using a conductor pattern by such etching, connecting respective elements is performed more easily.

Figure 10:
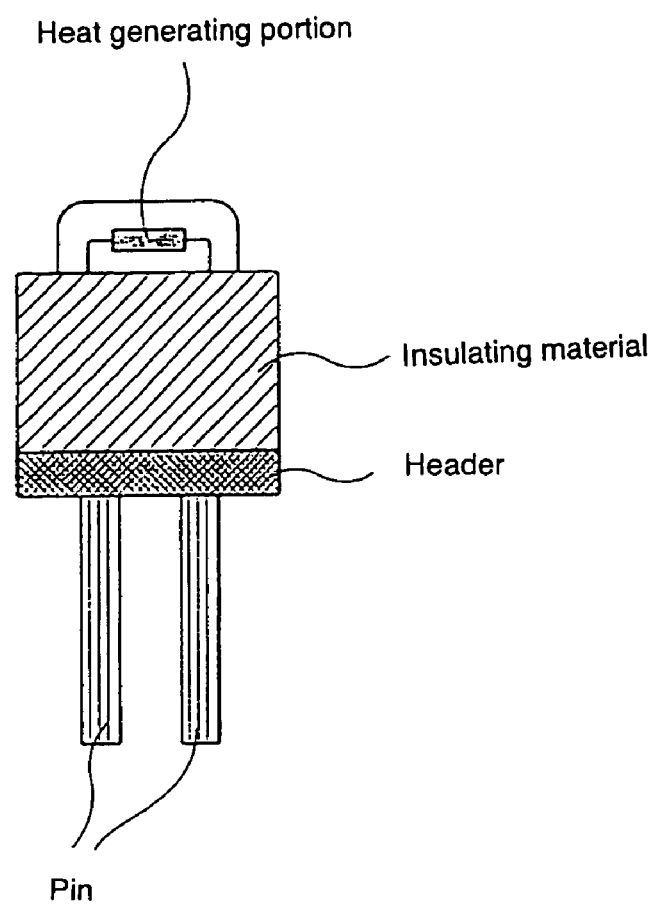
FIG. 10 is a front view of a substrate provided in an igniter used in the air bag system of the present invention and sealed with insulating material.

As shown in FIG. 10, when a portion of the substrate except for the heat generating portion is covered and sealed with insulating material such as epoxy resin, the sealing resin serves as a protection film for the integrated circuit or the capacitor, which is preferable. In FIG. 10, the substrate shown in FIG. 7 is used, but the substrate shown in FIG. 9 can be also used. The substrate is provided to stand on the glass header.

Next, the disposing state of the substrate will be explained with reference to FIG. 11. The substrate used in FIG. 11 is shown in FIG. 10, but, in the drawing, the priming covering the heat generating portion is deleted and the seating portion of the insulating material is partially cut out.

Figure 11:
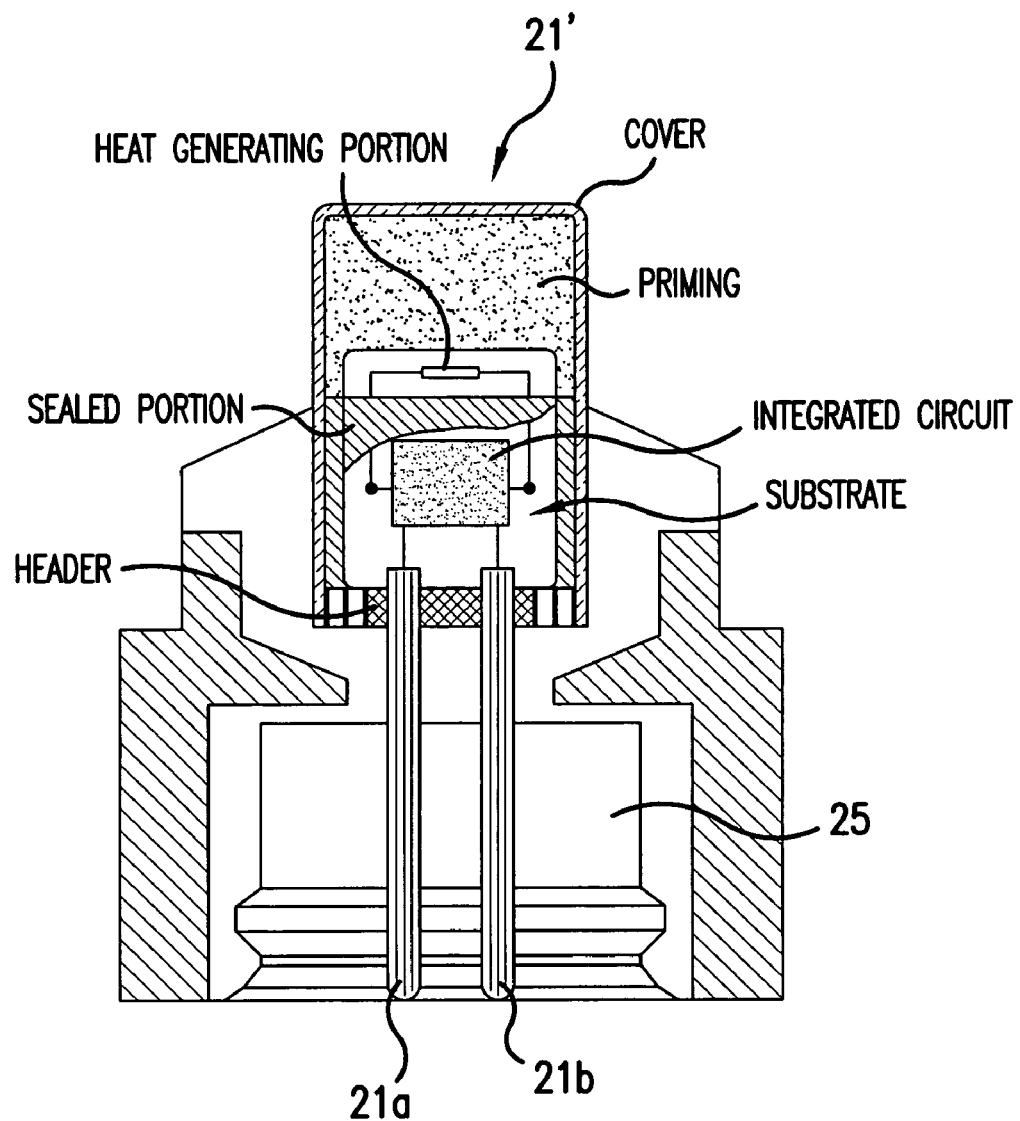
FIG. 11 is a vertical sectional view of another embodiment of an igniter used in the air bag system of the present invention.

As shown in FIG. 11, since the substrate shown in FIG. 10 is used as the substrate in the igniter 21' (having a different shape from the shape shown in FIG. 4), the substrate is provided to stand on the header, a portion of the substrate except for the heat generating portion is covered with insulating material such as epoxy resin, and the heat generating portion comes in contact with the priming. Contacting surfaces of a substrate bottom surface and the header are fixed by adhesive.

By providing the substrate on the header vertically in this manner, a space capacity for disposing the substrate can be made smaller than a case of laying the substrate, so that the igniter itself can be reduced in size. Then, since the integrated circuit and the capacitor on the portion of the substrate except for the heat generating portion do not come in contact with the priming, pollution thereof or the like are prevented.

Further, in the igniter 21 shown in FIG. 4, a glass header for supporting pins 21a and 21b sections vertically between the substrate and the priming, and a substrate arranged with the capacitor and the integrated circuit is provided below the header vertically. Then, the heat generating portion is disposed above the header (on a surface of the header), and the heat generating portion and the substrate are connected by conductors (two pins 22a and 22b). The heat generating portion is formed by employing a method for welding a wire for heat generation comprising a platinum/tungsten alloy, nickel/chrome alloy or the like on the header to fix the heat generating portion, or the like.

In the embodiment shown in FIG. 4, also, the integrated circuit, the capacitor, and the pins 21a and 21b can be connected by a conductor pattern obtained by etching, and the heat generating portion and the integrated circuit can be connected by a conductor pattern obtained by etching.

As described above, by providing the substrate below the header vertically, a space capacity for disposing the substrate can be made smaller than a case of laying the substrate, so that the igniter itself can be reduce in size. And, since the substrate and the priming do not come in contact with each other, pollution of the integrated circuit or the capacitor or the like can be prevented.

The air bag system of the second embodiment operates like the air bag system of the first embodiment.

(3) Third to Fifth Embodiments

As shown in FIG. 5, a capacitor, an integrated circuit recorded with information to exhibit a function for detecting abnormality of a heat generating portion in an igniter, and a heat generating portion of an igniter are disposed on a substrate. The information includes failure in line of the heat generating portion, a loose contact between the heat generating portion and the priming and the like.

Since abnormality such as failure in line, a loose contact between the heat generating portion and the priming or the like can be detected quickly by recording the above information in the integrated circuit, early exchange of parts can be performed to improve reliability of the system and safety of a vehicle occupant.

As shown in FIG. 5, the capacitor, the integrated circuit recorded with information to exhibit function for identifying each of the plural gas generators, and the heat generating portion of the igniter are disposed on the substrate. Preferably, the information to exhibit the above-described identifying function is recorded after the gas generator is assembled, after the gas generator is disposed into the module case, or after the module case is mounted in a vehicle.

By recording the above information of the identifying function in the integrated circuit in this manner, not only such management as storage, transportation or the like of a product is facilitated but also an erroneous activation such that an air bag is inflated differently from a command from the ECU is prevented in a practical use, so that reliability of the system and safety of a vehicle occupant can be improved.

As shown in FIG. 5, the capacitor, the integrated circuit recorded with information to exhibit a function for detecting a malfunction of the capacitor, and the heat generating portion of the igniter are provided on the substrate. The information includes information for measuring a pulse response or dielectric dissipation factor.

By recording the above information in the integrated circuit, a malfunction of the capacitor can rapidly be detected, so that prompt exchange of parts can be performed to improve reliability of the system and safety of a vehicle occupant.

In the above-described third to fifth embodiments, a current required for exhibiting each recorded information is supplied from the power source (a battery in a vehicle) to the integrated circuit via the bus lines 10 and 11 and the two pins 21a and 21b of the igniter 21, and a command for exhibiting the recorded information from the ECU is also transmitted to the integrated circuit via the same path as the current. Then, the air bag systems of the third to fifth embodiments operate like the air bag system of the first embodiment.

(4) Sixth Embodiment

Figure 12:
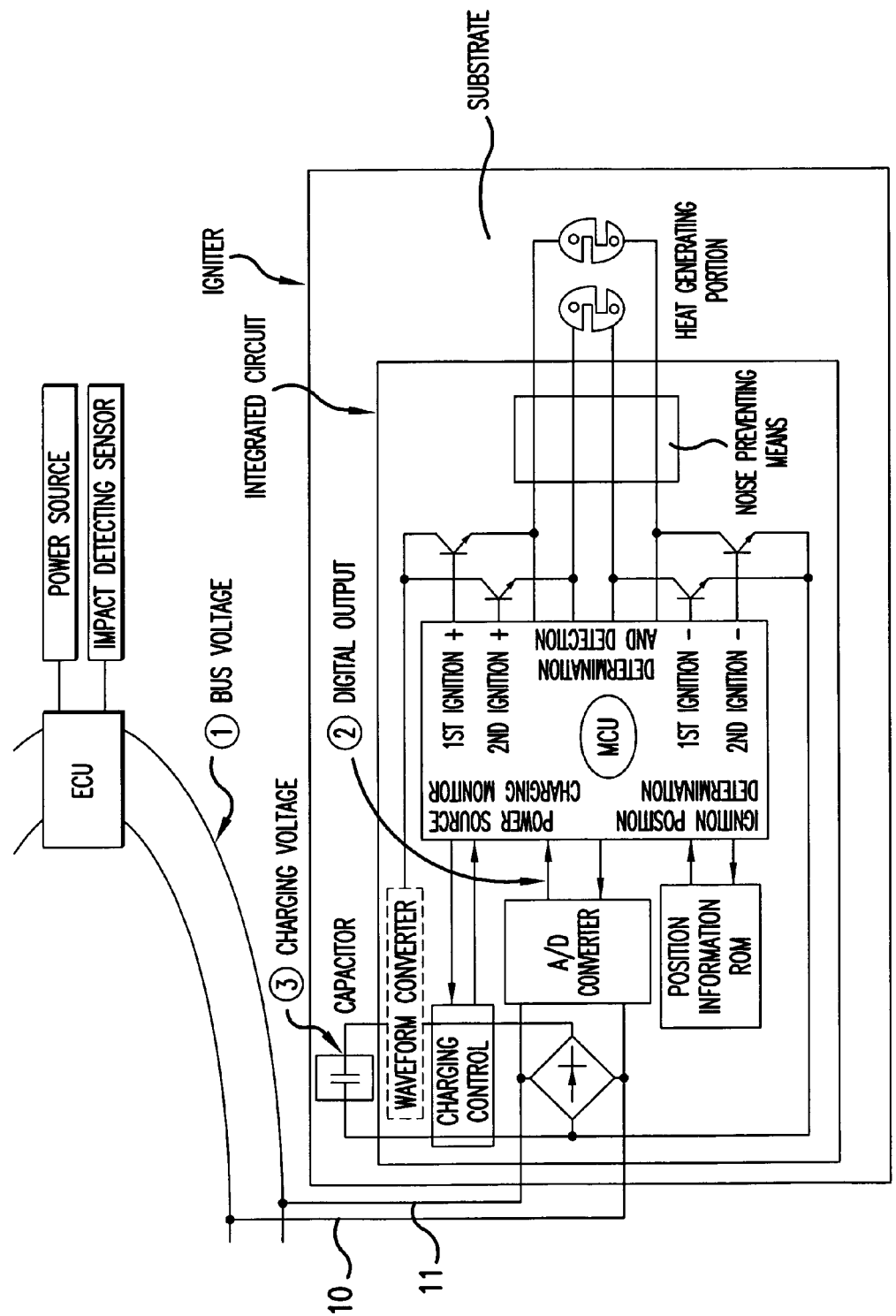
FIG. 12 is a vertical sectional view of another embodiment of an igniter used in the air bag system of the present invention.

In FIG. 12, in a gas generator having two igniters, two heat generating portions share one capacitor, an integrated circuit in which information for developing required functions has been recorded, and a waveform converting circuit provided if required.

When the gas generator has two igniters 31, 32, as shown in FIG. 3, three operation aspects such that a case of activating only either one of the igniters, a case of first activating one of the igniters and then activating the other with a slight delay, and a case of simultaneously activating the two igniters are considered according to a collision state of a vehicle, and, the integrated circuit of the igniter shown in FIG. 12 is recorded with such information to make two heat generating portions generate heat according to each of the above-described three instruction from the ECU.

The igniters 31 and 32 of the gas generator shown in FIG. 3 can be made to have the structures shown in FIG. 5 or in FIG. 12.

The air bag system of the sixth embodiment also operates like the air bag system of the first embodiment, and it operates in response to the above-described three command contents.

The air bag system of the present invention can be applied into various inflators (gas generators) such as an inflator for an air bag for a driver side, an inflator for an air bag for a passenger side next to the driver, an inflator for a side air bag, an inflator for a curtain air bag, an inflator for a knee-bolster air bag, an inflator for an inflatable seat belt, an inflator for a tubular system, and an inflator for a pretensioner.

What is claimed is:

1. An air bag system, comprising:
an electronic control unit connected to a power source and an impact detecting sensor;
a bus line having a plurality of loop wires passing through the electronic control unit to supply and transmit currents and required information; and a plurality of module cases, each module case accommodating a gas generator, connected to the electronic control unit via the bus line, and an air bag,
wherein, each gas generator is operationally connected to the bus line at predetermined portions of the bus line,
each gas generator is provided with one or more electric igniters connected to the bus line by a plurality of conductors, and the one or more electric igniters includes a heat generating portion, a priming adapted to be ignited by the heat generating portion, a capacitor, and an integrated circuit recorded with information to exhibit required functions, and
the one or more igniters is supplied with a current for igniting the priming through the capacitor, and a time period for supplying the current is from a point where a current value reaches a value corresponding to 5% of the maximum current value to a point where the current value reduces to the value corresponding to 5% of the maximum current value, which is within 500 μsec.

2. The air bag system according to claim 1, wherein the bus line includes two loop wires.

3. The air bag system according to claim 1 or 2, wherein, a waveform of the current supplied from the capacitor becomes a discharging waveform expressed by the following formula (I) when discharging starts at a time of time t=0:

$$i(t) = (V0/R) \times e^{-t/CR} \qquad (I)$$

where, v0 represents a capacitor charging voltage (V), R represents a circuit resistance (Ω), C represents a capacitor capacitance (μF), t represents a time (μsec), and i represents a current (A).

4. The air bag system according to claim 1 or 2, wherein each igniter includes a discharging waveform converting circuit which converts a signal waveform of the current for igniting the priming stored in the capacitor for each igniter.

5. The air bag system according to claim 4, wherein the discharging waveform converting circuit is provided in the integrated circuit.

6. The air bag system according to claim 1 or 2, wherein each igniter includes a circuit for preventing the igniter from being erroneously activated due to a noise generated outside the igniter.

7. The air bag system according to claim 1 or 2, wherein the period for supplying the current to the heat generating portion is within 200 μsec.

8. The air bag system according to claim 1 or 2, wherein the period for supplying the current to the heat generating portion is within 100 μsec.

9. The air bag system according to claim 1 or 2, wherein, the information is selected from a group of a function for detecting abnormality of the heat generating portion of the igniter in the gas generator, a function for identifying each of the plurality of gas generators, and a function for detecting a malfunction of the capacitor.

10. An air bag system, comprising:
an electronic control unit connected to a power source and an impact detecting sensor;
a bus line having a plurality of loop wires passing through the electronic control unit to supply and transmit currents and required information; and
a plurality of module cases, each module case accommodating a gas generator, connected to the electronic control unit via the bus line, and an air bag,
wherein, each gas generator is operationally connected to the bus line at predetermined portions of the bus line,
each gas generator is provided with one or more electric igniters connected to the bus line by only two conductors, and the one or more electric igniters includes a heat generating portion and a priming adapted to be ignited by the heat generating portion,
a capacitor, an integrated circuit in which information for developing a required function is stored, and the heat generating portion are provided on one substrate in each igniter, and
at least the capacitor and the integrated circuit, and the priming on the substrate are not in contact with one another, and a current for igniting the priming is supplied to the one or more igniters through the capacitor in the igniter.

11. An air bag system, comprising:
an electronic control unit connected to a power source and an impact detecting sensor;
a bus line having a plurality of loop wires passing through the electronic control unit to supply and transmit currents and required information; and
a plurality of module cases, each module case accommodating a gas generator, connected to the electric control unit via the bus line, and an air bag,
wherein, each gas generator is operationally connected to the bus line at predetermined portions of the bus line,
each gas generator is provided with one or more electric igniters connected to the bus line by only two conductors, and the one or more electric igniters includes a heat generating portion and a priming adapted to be ignited by the heat generating portion,
each igniter has a capacitor and an integrated circuit, in which information for developing a required function, on one substrate,
a header provided between the substrate and the priming and supports an electroconductive member for supplying and transmitting a current between the substrate and the heat generating portion, the substrate is provided below the header and the heat generating portion is provided above the header, and
the current for igniting the priming is supplied to one or more igniters through the capacitor.

12. The air bag system according to claim 10 or 11, wherein, the substrate is provided with a discharging waveform converting circuit which converts a signal waveform of the current for igniting the priming.

13. The air bag system according to claim 12, wherein the discharging waveform converting circuit is provided in the integrated circuit.

14. The air bag system according to claim 10 or 11, wherein the integrated circuit is provided on one surface of the substrate and the capacitor is provided on the other surface.

15. The air bag system according to claim 10 or 11, wherein the integrated circuit and the capacitor are provided on one surface of the substrate.

16. The air bag system according to claim 10, wherein the heat generating portion and the integrated circuit are provided on the same surface of the substrate.

17. The air bag system according to claim 10 or 11, wherein the heat generating portion includes a conductor pattern formed by etching or a heat generating body mounted by soldering.

18. The air bag system according to claim 10 or 11, wherein connecting portions which connect the integrated circuit with the capacitor and the bus line includes conductor patterns formed on the substrate by etching.

19. The air bag system according to claim 10 or 11, wherein a connecting portion between the integrated circuit and the heat generating portion, and the heat generating portion include conductor patterns formed on the substrate by etching.

20. The air bag system according to claim 19, wherein the conductor patterns which form the connecting portions connecting the integrated circuit with the heat generating portion, the capacitor, and the bus line have two routes respectively.

21. The air bag system according to claim 18, wherein the conductor patterns which form the connecting portions connecting the integrated circuit with the capacitor and the bus line have two routes respectively.

22. The air bag system according to claim 11, wherein the substrate is fitted to penetrate a header for forming a priming holding space together with a cup member for holding the priming, and the capacitor and the integrated circuit are provided below the header, and the heat generating portion projects above the header to come into contact with the priming.

23. The air bag system according to claim 11, wherein a portion of the substrate except for the heat generating portion is sealed with insulating material and the heat generating portion comes in contact with the priming.

24. The air bag system according to claim 23, wherein the substrate is provided above a header for supporting pins serving as interposition members which supply and transmit a current and required information to the integrated circuit and the capacitor.

25. The air bag system according to claim 1 or 10, wherein at least two igniters share one capacitor, one integrated circuit is inputted with information to exhibit required functions, and a discharging waveform converting circuit is provided, if required, to convert one signal waveform of a current for igniting the priming for each igniter when each of the plurality of gas generators has at least two igniters.

26. The air bag system according to claim 1 or 10, wherein each igniter further includes two pins for supplying and transmitting the current and required information to at least two igniters from the bus line when each gas generator includes at least two igniters.

* * * * *